United States Patent [19]

Rebel et al.

[11] Patent Number: 4,570,236
[45] Date of Patent: Feb. 11, 1986

[54] MULTI-DIMENSIONAL PARALLEL STORAGE DEVICE

[75] Inventors: Burghard Rebel; Michael Gössel, both of Berlin, German Democratic Rep.

[73] Assignee: Akademie der Wissenschaften der DDR, Berlin, German Democratic Rep.

[21] Appl. No.: 545,739

[22] Filed: Oct. 26, 1983

[30] Foreign Application Priority Data

Oct. 26, 1982 [DD] German Democratic Rep. ... 244274

[51] Int. Cl.[4] .................. G06F 13/00; G06F 15/347
[52] U.S. Cl. ................................. 364/900; 364/200; 340/721; 340/750; 382/44
[58] Field of Search ... 364/200 MS File, 900 MS File; 371/2, 11; 382/41, 44; 340/721, 750; 365/230

[56] References Cited

U.S. PATENT DOCUMENTS

| 3,995,253 | 11/1976 | Morrin, II et al. | 382/44 |
| 4,101,960 | 7/1978 | Stokes et al. | 364/200 |
| 4,174,514 | 11/1979 | Sternberg | 364/200 X |
| 4,400,768 | 8/1983 | Tomlinson | 364/200 |

OTHER PUBLICATIONS

"The Prime Memory System for Array Access" by Duncan H. Lawrie.
"Parallel Memory with Recursive Address Computation" by M. Gössel and B. Rebel.

Primary Examiner—James D. Thomas
Assistant Examiner—Thomas Lee
Attorney, Agent, or Firm—Michael J. Striker

[57] ABSTRACT

Disclosed is a multi-dimensional parallel storing device, particularly for use in digital storing of picture elements scanned according to a scanning pattern. The device includes a plurality of multi-dimensional storage elements each being provided with an address-computing circuit. The address-computing circuit is assembled of a subcircuit for the recursive computation of a storage element of a distinguished or reference array point for a linear storing function after shifting of the window; a subcircuit for recursive computation of a reference array point for an isotropic addressing function; a translator for isotropic, preferably linear, storing function to determine a spacing vector of an array point for which the address computation is being performed and which is stored in a storage element pertaining to the referenced array point; and an arrangement for ascertaining the address of an arbitrary storage element. The storage arrangement of this invention is suitable for use in high-speed computers and operates with short binary words and enables access to all types of memory windows, such as rectilinear, flat or spatial. The address-computing circuit of this invention requires only the data about coordinate changes and about the preceding memory window and the coded designation of the window. The address computation is recursive.

7 Claims, 6 Drawing Figures

MULTI-DIMENSIONAL PARALLEL STORAGE DEVICE

BACKGROUND OF THE INVENTION

The invention relates in general to digital data processing, especially to digital picture processing, and in particularly to a multi-dimensional parallel storage device having an improved access to stored picture elements which are to be subsequently processed in high-speed data processors.

Due to high computing speeds which are frequently required for processing images, extremely fast computers of specialized design are frequently employed for the digital image processing. Such fast computers require very large storing units for output data, intermediate results and final results of the processing, as well as a very fast access to such storing units, whereby though these requisite access times are still shorter than the access times of available storing elements. In contemporary data-processing units, these contradictory requirements are solved in such a manner that the storage devices are designed with a degree of parallelism.

In parallel storage devices, in a single access cycle for example several storage elements, and hence several storing locations, are addressed simultaneously. Provided that each storage location contains a picture element of an image, then several picture elements are simultaneously available at the output of the arrangement, or vice versa several picture elements are written in simultaneously into the storing arrangement.

The effective time of the cycle, when related to a single picture point or element, is thus reduced by the number of parallel-connected storage elements. In storage devices of this kind, those picture points are with advantage connected in parallel which in the computer are simultaneously required in one processing step, or are presented in the result of a computing step.

There are several forms of such picture segments. These forms of picture segments therefore must also be in agreement with access forms of a parallel storage device. The realization of such access forms requires that the picture points which are to be addressed in parallel be located as different storage elements and, in addition, that the determination of an address pertaining to each of these storage elements be performed with manageable expenditures for arithmetic-logic functional units.

Known are technological solutions which permit the parallel access to all multi-directional lines in a multi-dimensional array. The number of storage elements in such prior-art devices corresponds to a prime number, which in a two-dimensional array is larger than or equal to 5, and in a three-dimensional array is larger than or equal to 11. Such technological solutions are described for example in H. D. Shapiro, Theoretical limitations on the use of parallel memories, Ph. Thesis, December 1975, Report UIUCDSR-75-776, Dep. of Computer Science, University of Illinois, Urbana Ill. and in German Pat. No. 2,718,849.

In digital image processing, in which those groups of picture elements which are to be accessed in parallel and from one access to another are located close to one another, the prior-art arrangements exhibit certain disadvantages. More specifically, these disadvantages reside in the fact that during each access completely new coordinates i, j and k of a window must be applied in the address-computing circuit, and consequently the address computation must be carried out by using large numbers, necessitating the use of words of large width. For relatively small variations of the position of the window in a three-dimensional array, such prior-art arrangements are expensive and relatively slow.

Another disadvantage of such known arrangement is in the fact that parallel access to windows can be made in a straight-line form, whereas in the picture processing also flat and spatial windows are of interest.

SUMMARY OF THE INVENTION

It is therefore a general object of the present invention to overcome the aforementioned disadvantages.

More particularly, it is an object of the invention to provide an improved method of and a device for computing addresses in the storage device of the aforedescribed kind which can operate with substantially smaller word widths for computing the addresses.

An additional object of the invention is to provide such an improved multi-dimensional storage device which in addition to accesses in a straight-line form permits only access to flat and spatial windows.

A further object of the invention is to provide such an improved multi-dimensional storage device having a parallel access to all windows without interfering with isotropic, preferably linear, storing functions, namely the array points of the access format are stored in different storage elements.

A still further object of this invention is to provide such an improved storage device in which the access data to all windows in a straight-line form are given in a multi-dimensional array, whereby the circuit for computing the addresses does not operate with coordinates which describe the position of the window in the area but it operates with coordinate changes relative to the previously accessed window.

In this context, an isotropic storage function means that, if two array points are assigned to equal storage elements, then to the adjoining array points are also assigned equal storage elements.

Under the term "straight lines" are to be understood all, even interrupted, lines of N array points in a multi-dimensional array, whereby the spacing between two consecutive array points of interrupted lines is constant, and N means a prime number.

An arbitrary reference point of a spatial, flat or straight-line window under consideration is designated as a distinguished point of the window.

In keeping with these objects and others which will become apparent hereafter, one feature of the invention resides, in a multi-dimensional parallel storage device, in the provision of N storage elements each being provided with an address-computing circuit, each address-computing circuit having inputs for receiving values corresponding to coordinate changes of an access format for N array points, and these inputs being connected to corresponding inputs of an arrangement for recursive computation of a storage-element address for a distinguished array point for isotropic, preferably linear, storage functions after the shifting and also are connected to corresponding inputs of an arrangement for recursive computation of a distinguished array point for isotropic addressing function. The output of the arrangement for the recursive computation of the storage element of a distinguished array point is connected to an input of an interpreter of isotropic, preferably linear, storage functions for determining a spacing vector $(x_1, \ldots, x_n)$ of the array point which depends only on the storage element which is assigned to the distinguished array point and for which the address computation is being performed, and which is stored in a storage element pertaining to the corresponding address-computing circuit. The number of storage elements for which the address computation is being performed is applied to a second input of the interpreter, and a third, multi-channel input of the interpreter is fed a coded characteristic mark of the window. The outputs of the interpreter as well as the outputs of the arrangement for the recursive address computation of the distinguished array point are connected to an arrangement for determining the address of the corresponding storage element. At the output of the last arrangement occurs the computed address.

The change of memory window coordinates in principle is not subject to any limitations, even if in practice are preferred small changes of the coordinates and in practice it is assumed that $|\Delta i| < N_1 |\Delta j| < N_1 |\Delta k| < N$. For changes which are larger than N (number of memory elements), the addressing-computing circuit can be readily modified so that suitable constants, which are multiples of N, are added to the spacings or coordinates of vectors $x_1$, $x_2$ and $x_3$ which indicate the actual position of arbitrary storage or memory elements to the element S in which distinguished reference array point of the window at a time point t is located. Otherwise, even in this case, the address-computation circuit is unchanged.

As mentioned before, N denotes the number of all storage elements in the multi-dimensional memory. Constants a and b are determined from $0 \leq a$, $b < N$.

The functions $f_1^F$, $f_2^F$ and $f_3^F$ for an arbitrary permissible window F are given in the form of tables.

The tables for the above functions $f_1^F$, $f_2^F$, $f_3^F$ for all possible window can be determined from a number Z of array points ($Z \leq N$), whereby the array points of an access format are stored in differing storage elements, and the storage functions are determined by the aforementioned parameters a and b. By the linear storage function $S(i,j,k)=(a \cdot i + j + b \cdot k) \bmod N$, it is defined that the array point $(i,j,k)$ of a three-dimensional array be stored in a storage element $S(i,k,j)$. Then the window F under consideration is located in the array in such a manner that a distinguished reference point of the window coincides with an array point $i_1, j_1, k_1$ with $S(i_1, j_1, k_1)=0$. It is assumed that $f_1^F(0)=f_2^F(0)=f_3^F(0)=0$. In the further steps, an array point $(i_2,j_2,k_2)$ is to be found in the window location for which the expression $S(i_2,j_2,k_2)=1$. If there is such a point, then one sets $f_1^F(1)=i_2-i_1$, $f_2^F(1)=j_2-j_1$, $f_3^F(1)=k_2-k_1$. If such a point is not found, then $f_1^F(1)$, $f_2^F(1)$ and $f_3^F(1)$ are not determined. Then a point $(i_3,j_3,k_3)$ is to be found in the window for which the expression $S(i_3,j_3, k_3)=2$ is valid. If there is such a point in the window, the $f_1^F(2)=i_3-i_1$, $f_2^F(2)=j_3-j_1$, $f_3^F(2)=k_3-k_1$; if there is no such point, then $f_1^F(2)$, $f_2^F(2)$ and $f_3^F(2)$ are not determined.

Thereafter, the window is searched for a point $(i_4,j_4,k_4)$ for which $S(i_4,j_4,k_4)=3$ is valid. When such a point is found, then $F_1^F(3)$ is set to be equal to $i_4-i_1$, $f_2^F(3)=j_4-j_1$, $f_3^F(3)=k_4-k_1$. If no such point is found, then the above functions $f_1^F(3)$, $f_2^F(3)$, $f_3^F(3)$ are not determined. One continues in an analogous manner, until a point $i_N, j_N, k_N$ is found for which the expression $S(i_N,j_N,k_N)=N-1$ is valid. When such point is found, then $f_1^F(N-1)$ is set to equal $i_N-i_1$, $f_2^F(N-1)=j_N-j_1$, $f_3^F(N-1)=k_N-k_1$. If there is no such point, then the functions $f_1^F(N-1)$, $f_2^F(N-1)$, $f_3^F(N-1)$ are undefined.

In this manner, the definition of functions $f_1^F$, $f_2^F$, $f_3^F$ is completed.

If the window F consists of array points $M < N$, then the above functions $f_1^F$, $f_2^F$, $f_3^F$ are partially defined. In operation of the address-computing circuit only the defined values of these functions are needed.

For the sake of simplicity, the linear storage function $S(i,j,k)$ has been set in the form $(a \cdot i+j+b \cdot k) \bmod N$.

The originally generally set storage function $S(i,j,k) = (a^* \cdot i + c^* \cdot j + d^* \cdot k) \bmod N$ can be transformed by a suitable transformation of coordinates and by renaming the storage elements, i.e. by formal division of $S^*$ by a constant $\bmod N$ into a desired form, provided that not each of the three constants $a^*$, $b^*$, $c^*$ in the function $S^*$ are not zero denominators of N. The modification of the address-computing circuit for memories of more than three dimensions can be readily made without problems. The three-dimensional memory is considered by way of example only, for reasons of simplicity.

The following conditions are to be observed for an arbitrary window in a rectilinear form in a three-dimensional array with linear addressing and storing functions which include the constants a and b:

N is a prime number larger than or equal to 11. Hence, $N_1 = N$. The constants a and b are to be selected such that $(a+b) \bmod N \neq 0$ $(a-b) \bmod N \neq 0$ $(a+b \pm 1) \bmod N \neq 0$ $(a-b \pm 1) \bmod N \neq 0$ $2 \leq a$, $b \leq N-2$ For $N \geq 11$, the constants $a=2$, $b=4$ fulfill all conditions. Furthermore, for $\delta_F = (a \cdot e_1 + b \cdot e_3 + e_2) \bmod N \neq 0$.

In the following examples, it is assumed that $0 \leq |e_1|_1 |e_2|_1 |e_3|_1 < N$. The latter condition, however, is not obligatory. If any of the values $|e_i| \geq N$, then the address-computing circuit of this invention can be readily modified by adding to x a suitable constant which is a multiple of N. For a special case of the window, the condition that $\delta_F \neq 0$ can be always fulfilled by suitable selection of constants a and b.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
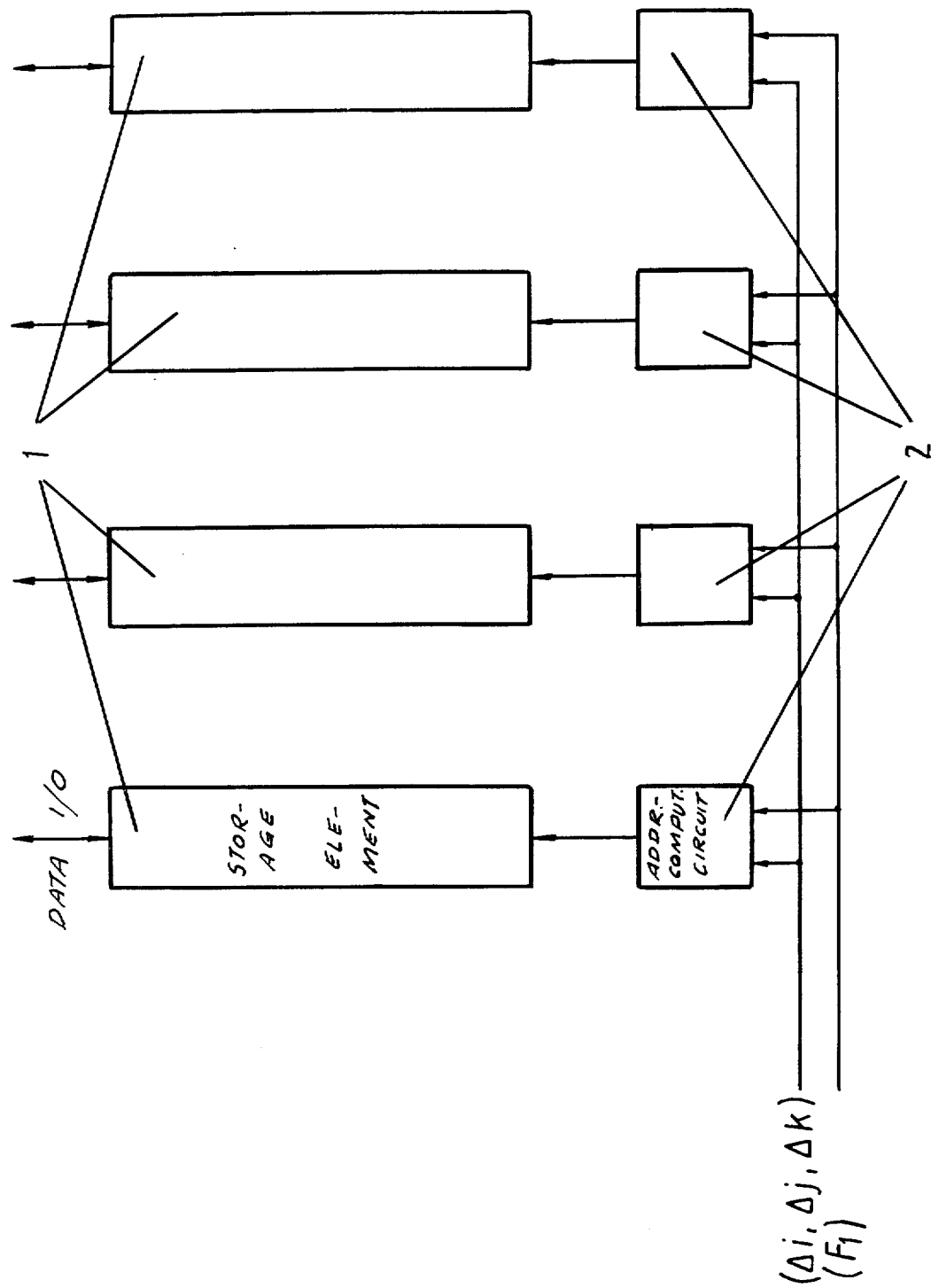
FIG. 1 is a block circuit diagram of a storage device of this invention.

FIG. 1 shows the principal arrangement of a three-dimensional storage device of this invention, in which each address-computing circuit 2 is supplied at one input bus with values $\Delta i$, $\Delta j$, $\Delta k$ corresponding to coordinate changes, and at the other input bus with a value F defining a memory window. It will be seen that each address-computing circuit is connected to the input of a single storage element 1.

Figure 2:
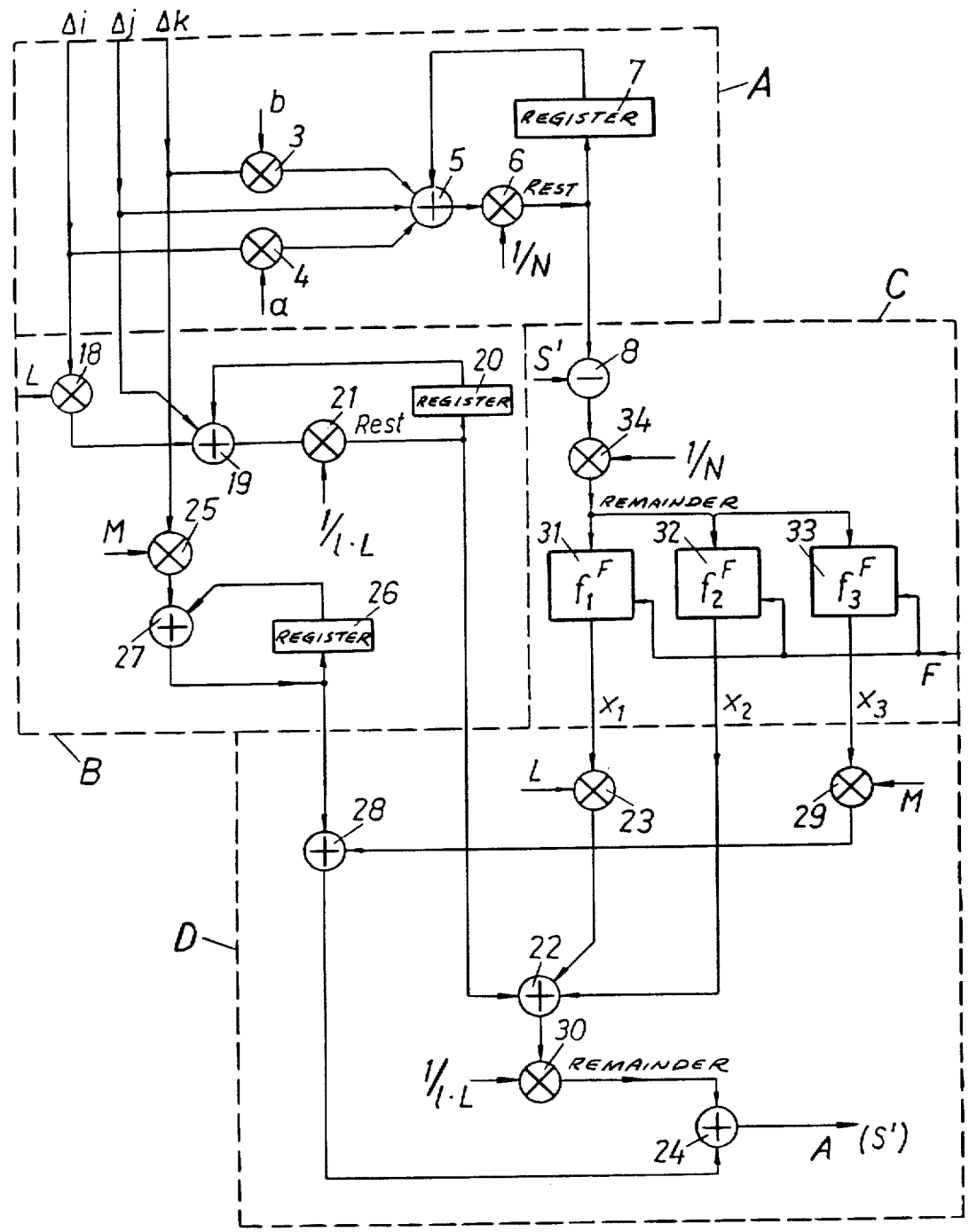
FIG. 2 is a block circuit diagram of an address-computing circuit for a storage element of a three-dimensional storage device.

An example of an address-computing circuit 2 for one storage element of a three-dimensional storage device is illustrated in FIG. 2. In this Figure, A denotes an arrangement for the recursive computation of a storage element of a distinguished array point for linear storing functions after the time point of shifting. Inputs $\Delta i$ and $\Delta k$ are connected to multipliers 3 and 4 which multiply coordinate changes $\Delta k$ and $\Delta i$ by constants b and a. The third input $\Delta j$ of the arrangement and the outputs of the multipliers are connected to an adder 5. A fourth input of the adder 5 is connected to the output of a register 7. The output of the adder 5 is connected to another multiplier 6 where the output signal is multiplied by 1/N, i.e., it is divided by the number N of storage elements. The remainder of this division is applied to the inputs of register 7 to load a value $\bar{S}$ denoting a storage element pertaining to the distinguished array point in the register 7 and to feed this signal to the output of the circuit arrangement A.

The arrangement B serves for recursive address computation of the distinguished array point for isotropic addressing functions:

A multiplier 18 is connected to the input $\Delta i$ for multiplying the corresponding coordinate change $\Delta i$ with a constant value L. The output of the multiplier 18 and the input $\Delta j$ are connected through an adder 19. A third input of the adder 19 is connected to the output of a shift register 20. The output of adder 19 is connected to a multiplier 21 where the output signal is multiplied by a value 1/1L, applied to the second input of the multiplier 21. The output bus of the multiplier 21 delivers a signal corresponding to the remainder of the division by the value 1L (modulo-1L-generator) are applied to the inputs of the register 20 and also to a first output of the circuit arrangement B. The input bus for $\Delta k$ is connected to the input of a multiplier 25 where it is multiplied by a value M applied to the second input of the multiplier.

The output of the multiplier 25 is connected to the input of an adder 27. The second input of adder 27 is connected to the output of register 26, and the output of adder 27 is connected to the input of register 26 and also to the second output of the circuit arrangement B.

An interpreter or translator C serves for determining a spacing vector $x_1$, $x_2$, $x_3$:

The output of circuit arrangement A leads to a subtractor 8 whose second input is supplied with a value S' of the storage element for which the address computation is being made. The difference $S' - \bar{S}$ is supplied to the input of a multiplier (moduloN-generator) 34 whose second input is supplied with a value 1/N, so that the difference $S' - \bar{S}$ is divided by N. The output of the multiplier 34 which carries the remainder of the result of the division is applied to an ROM memory, which is assembled of three stores 31, 32, 33. The second input of each store is supplied with value F which denotes the memory window under consideration. The stores 31, 32, 33 forming the ROM memory produce the functions $f_1{}^F$, $f_2{}^F$, $f_3{}^F$ as described above. The outputs of the translator C are buses $x_1$, $x_2$ and $x_3$.

The arrangement D serves for the determination of an address of the corresponding storing element:

The output $x_1$ of the translator C is connected to an input of a multiplier 23 whose second input is supplied with a constant value L. The output $x_3$ of the translator is connected to the input of another multiplier 29 whose other input is supplied with a constant value M. The first output of the circuit arrangement B for computing the address of the distinguished array point is connected to the input of an adder 22. Another input of the adder 22 is connected to the output of the multiplier 23, and a third input of the adder is connected to the output $x_2$ of the store 32 in the translator C. The output of adder 22 is connected to the input of a multiplier 30 whose second input is applied with a value 1/1L. An input bus of the adder 28 is connected to the output of the adder 27 in the circuit arrangement B, and another input bus of the adder 28 is connected to the output of multiplier 29.

The output of the adder 28 and the output of multiplier 30 supplying the remainder of the division by 1L are connected to the corresponding inputs of an adder 24. The output bus of the adder 24 is connected to the address inputs of storage elements 1 to determine the address of the element S'.

As described before, each storage element is provided with the above described address computing circuit, which computes the following relations:

(a) A number S of a storage element S in which a picture element is stored which in the preceding access was the distinguished array point of the memory window, is added (moduloN) with the sum of the coordinate change in the j-direction, with the product of a coordinate change in y-direction and a constant a, and with the product of a coordinate change in k-direction and a constant b, to produce a value $\bar{S}$.

(b) A relative difference value d is generated as a difference modulo N from the number S' of the assigned storage element S' and the value $\bar{S}$ described above under (a).

(c) By means of the translator for determining the three functions $f_1{}^F$, $f_2{}^F$, $f_3{}^F$, three values $(x_1, x_2, x_3)$ are assigned to the difference $(S' - \bar{S})$ computed above under paragraph (b) with the condition that different values $(S' - \bar{S})$ modulo N are correlated to different tripel $(x_1, x_2, x_3)$; that all these components $x_1$, $x_2$, $x_3$ of a triple are not simultaneously equal to $n \cdot N$ where $n \geq 1$; and that the following relationship is valid: $f_1{}^F(0) = f_2{}^F(0) = f_3{}^F(0) = 0$.

(d) An address portion $a_1$ determined from i and j and time point $t + \Delta t$ for the storage element in the distinguished array point is formed as a sum of the address portion $a_1'$ which was determined in the preceding access at the time point t, the product of coordinate change in the direction i and a constant L as well as of the coordinate change in the j-direction.

(e) An address portion $a_2$ determined by k at a time point $t+\Delta t$ for the storage element in the distinguished array point is formed as a sum of the address portion $a_2'$ which was determined in the preceding access at the time point t, and the product of the coordinate change in the k-direction and a constant M.

(f) The address portion $a_1^{(P)}$ for the assigned storage element P is formed as the sum modulo $1 \cdot L$ of the address portion $a_1$ (according to (d)) and the product of $x_1$ and the constant L and the value $x_2$.

(g) The address portion $a_2^{(P)}$ for the assigned storage element P is formed as the sum of the address portion $a_2$ (according to (e)) and the product of $x_3$ and the value M.

(h) The address $A^{(P)}$ of the assigned store P is formed as the sum of $a_1^{(P)}$ and $a_2^{(P)}$.

Accordingly, for the individual functional groups of the above-described address-computing circuit, the following analytical relationships result:

(a) $\bar{S}: = (S + a \cdot \Delta i + \Delta j + b \cdot \Delta k) \mod N$,
(b) $d: = (S' - \bar{S}) \mod N$,
(c) $x_1: = f_1^F(d), x_2 = f_2^F(d), x_3 = f_3^F(d)$,
(d) $a_1: (a_1' + L \cdot \Delta i + \Delta j) \mod 1 \cdot L$,
(e) $a_2: = (a_2' + M \cdot \Delta k)$,
(f) $a_1^{(P)}: = (a_1 + L \cdot x_1 + x_2) \mod 1 \cdot L$,
(g) $a_2^{(P)}: = (a_2 + M \cdot x_3)$,
(h) $A^{(P)}: = a_1^{(P)} + a_2^{(P)}$.

For the operation of the circuit of this invention the following parameters are to be selected:

L is greater than or equal to the number of array points of a picture line in j-direction.

1 is to be selected such that the smallest common denominator of 1 and $N_1$ is greater than or equal to the number of array points in one picture column (i-direction), whereby $N_1$ is the smallest number so that $N_1 \cdot a = 0 \mod N$.

M is greater than or equal to the product of 1 and L.

Figure 3:
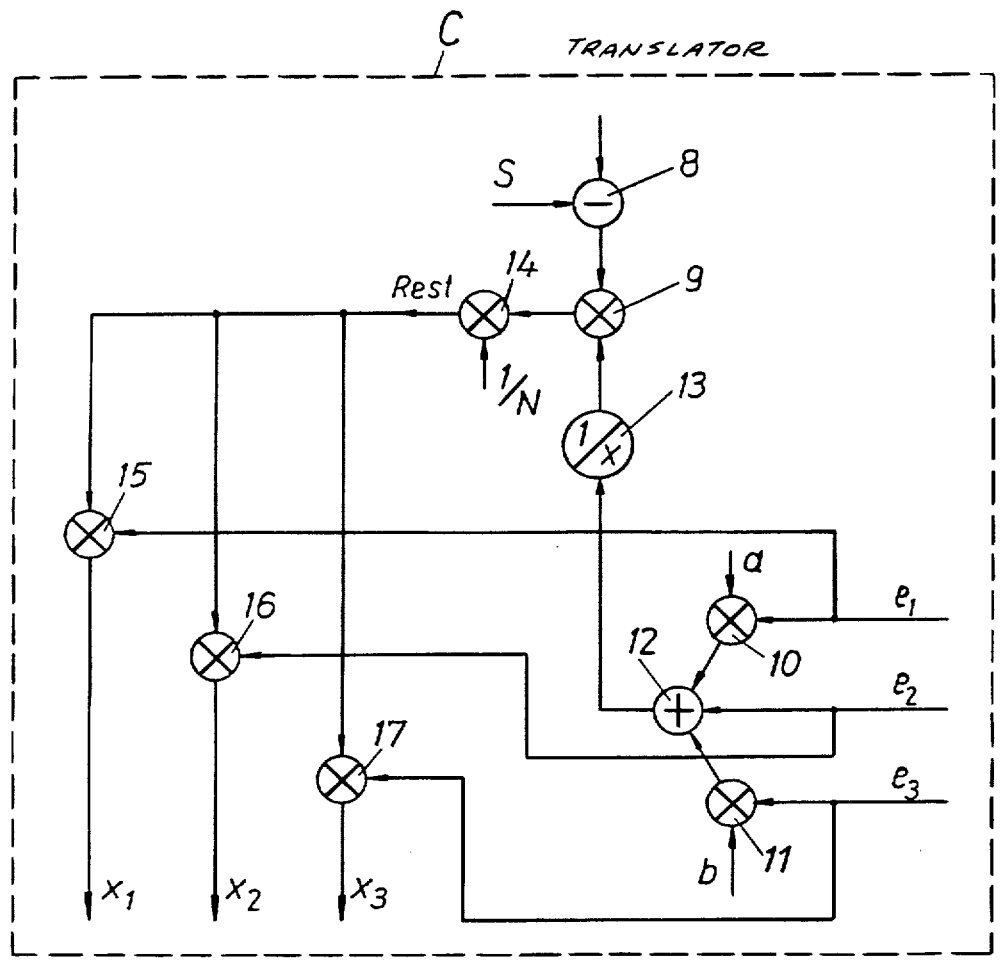
FIG. 3 is a block circuit diagram of a translator of linear storing functions for determining spacing vectors $x_1$, $x_2$, $x_3$ of memory windows in linear form in a three-dimensional array.

Referring now to FIG. 3, there is shown a translator for the address-computing circuit of FIG. 2 which when designed on the basis of the aforementioned relationships serves for the address computation for all windows in straight-line form. In this circuit, $e_1$, $e_2$, $e_3$ denote the spacings of window points in i-, j- and k-directions of the window in straight form, as a special case of F (coded designation of the window).

A multiplier 10 multiplies the value $e_1$ by a, a second multiplier 11 multiples the value $e_3$ by b. The outputs of the two multipliers 10 and 11 and the input bus of signals $e_2$ are connected to corresponding inputs of an adder 12. The output of adder 12 is connected to the input of a divider 13 which produces a reciprocal value of the sum. The output of divider 13 is connected to the input of a further multiplier 9 whose other input is connected to the output of a subtractor 8. The output of multiplier 9 is connected to the input of another multiplier 14 whose second input is supplied with a value 1/N. The output bus of multiplier 14 carries the result of the division by N and is connected to assigned inputs of multipliers 15, 16, 17. The second input of multiplier 15 is connected to the conductor for value $e_1$, the second input of multiplier 16 is connected to the input conductor $e_2$ and the second input of multiplier 17 is connected to the input conductor $e_3$. The output of multiplier 15 is connected to the input of a multiplier 23 whose other input is supplied with the value L. The output of multiplier 16 is connected to an input of the adder 22 (FIG. 2) whose other inputs are connected respectively to the multiplier 21 (modulo-1-L-generator) and to the multiplier 23 (arrangement D). The output of multiplier 17 in the translator of FIG. 3 is connected to an input of multiplier 29 (FIG. 2). The remainder of circuit elements in FIG. 3 corresponds to those described in FIG. 2.

The distance or spacing between two array points lying on a straight line one after the other in the i-direction is $e_1$, in the j-direction is $e_2$, and in the k-direction is $e_3$.

Each of the recursive address-computing circuits assigned to respective storage elements and creating the aforedescribed relationships (a) through (h), can use the following relationships instead of the relations (b) and (c):

(i) A constant $\delta_F$ characterizing a window in a linear form is formed as a sum modulo N from the distance or spacing $e_2$ between two array points arranged one after the other in the j-direction in the window, and the product of two array points arranged in the window one after the other in the i-direction and a constant a, and the product from the spacing $e_3$ of two consecutive array points arranged in a window in k-direction, and a constant b.

(j) A relative difference value m is formed as a quotient modulo N from the difference of the number S' and the value S (defined in accordance with (a)), and divided by $\delta_F$.

(k) The three spacings $e_1$, $e_2$, $e_3$ are multiplied by the relative difference value m, and the results are the values $x_1$, $x_2$, $x_3$.

For the above described functional groups the following analytical relationships are valid:

(i) $\delta_F: = (a \cdot e_1 + b \cdot e_3 + e_2) \mod N$,
(j) $m: = (S' - \bar{S})/\delta_F \mod N$,
(k) $x_1: = m \cdot e_1, x_2: = m \cdot e_2, x_3: = m \cdot e_3$.

On the basis of the following disclosure various modifications and structural changes in the circuit for computing the address can be made. For instance, if only a small number of different access formats and window shifts are needed, then the input conduits for $e_1$, $e_2$, $e_3$ and for $\Delta j$, $\Delta i$, $\Delta k$ can be combined together by a suitable code.

An example of the actual embodiment of an address-computing circuit for a three-dimensional storage device will be explained in the following description:
Picture format: $256 \times 256 \times 32$ N: 11
a: 2
b: 4
1: 32
L: 256
M: $2^{13}$
$\Delta i$: 0, 1, ..., N−1
$\Delta j$: 0, 1, ..., N−1
$\Delta k$: 0, 1, ..., N−1

Considered are first two flat windows $F_1$ and $F_2$. $F_1$ is square $3 \times 3$ window in a plane (i=const.); $F_2$ is a rectangular $2 \times 5$ window in a plane (k=const.). These two windows $F_1$ and $F_2$ are designated by boxed fields in Table 1. The distinguished array point of windows $F_1$ and $F_2$ is the point (0,0,0,).

TABLE 1

Table 1 illustrates the storage function S (i,j,k) = (2i + j + 4k) mod 11, and also the windows F₁ (delimited by full line) and F₂ (delimited by dashed line).

```
j ———>

0  1  2  3  4  5  6  7  8  9 10  0  1
    2  3  4  5  6  7  8  9 10  0  1  2  3
i   4  5  6  7  8  9 10  0  1  2  3  4  5   k = 0
↓   6  7  8  9 10  0  1  2  3  4  5  6  7
    8  9 10  0  1  2  3  4  5  6  7  8  9
   10  0  1  2  3  4  5  6  7  8  9 10  0

4  5  6  7  8  9 10  0  1  2  3  4  5
    6  7  8  9 10  0  1  2  3  4  5  6  7
    8  9 10  0  1  2  3  4  5  6  7  8  9   k = 1
   10  0  1  2  3  4  5  6  7  8  9 10  0
    1  2  3  4  5  6  7  8  9 10  0  1  2

8  9 10  0  1  2  3  4  5  6  7  8  9
   10  0  1  2  3  4  5  6  7  8  9 10  0
    1  2  3  4  5  6  7  8  9 10  0  1  2
    3  4  5  6  7  8  9 10  0  1  2  3  4   k = 2
    5  6  7  8  9 10  0  1  2  3  4  5  6
    7  8  9 10  0  1  2  3  4  5  6  7  8
```

The functions $f_1^{F1}$, $f_2^{F1}$, $f_3^{F1}$ and $f_1^{F2}$, $f_2^{F2}$, $f_3^{F2}$, which define the three stores 31, 32, 33 of the translator C, are determined from the windows F₁ and F₂, described before. These functions are illustrated in the following Table 2. In the Table, a hyphen denotes that the corresponding function is not defined.

TABLE 2

| u | $f_1^{F1}$ (u) | $f_2^{F1}$ (u) | $f_3^{F1}$ (u) | $f_1^{F2}$ (u) | $f_2^{F2}$ (u) | $f_3^{F2}$ (u) |
|---|---|---|---|---|---|---|
| 0 | 0 | 0 | 0 | 0 | 0 | 0 |
| 1 | 0 | 1 | 0 | 0 | 1 | 0 |
| 2 | 0 | 2 | 0 | 1 | 0 | 0 |
| 3 | — | — | — | 1 | 1 | 0 |
| 4 | 0 | 0 | 1 | 2 | 0 | 0 |
| 5 | 0 | 1 | 1 | 2 | 1 | 0 |
| 6 | 0 | 2 | 1 | 3 | 0 | 0 |
| 7 | — | — | — | 3 | 1 | 0 |
| 8 | 0 | 0 | 2 | 4 | 0 | 0 |
| 9 | 0 | 1 | 2 | 4 | 1 | 0 |
| 10 | 0 | 2 | 2 | — | — | — |

It is evident from Table 2 that for this storage eleven address-computing circuits and eleven storage elements are necessary to achieve a 256K bit storing capacity.

Figure 4:
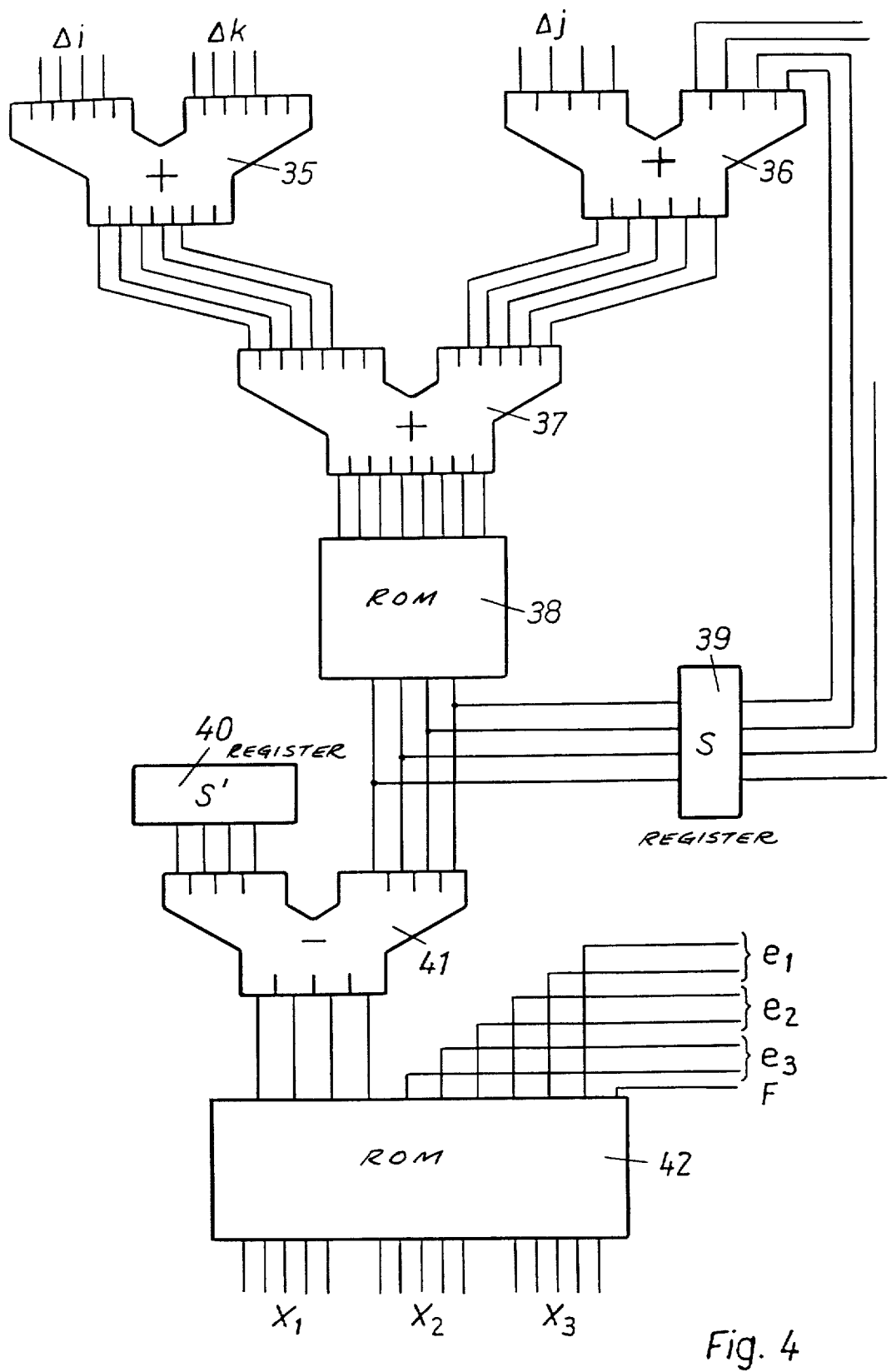
FIG. 4 is a schematic block circuit diagram of all groups of subcircuits for determining the spacing vectors $x_1$, $x_2$, $x_3$ for an actual embodiment of FIG. 2.
Figure 5:
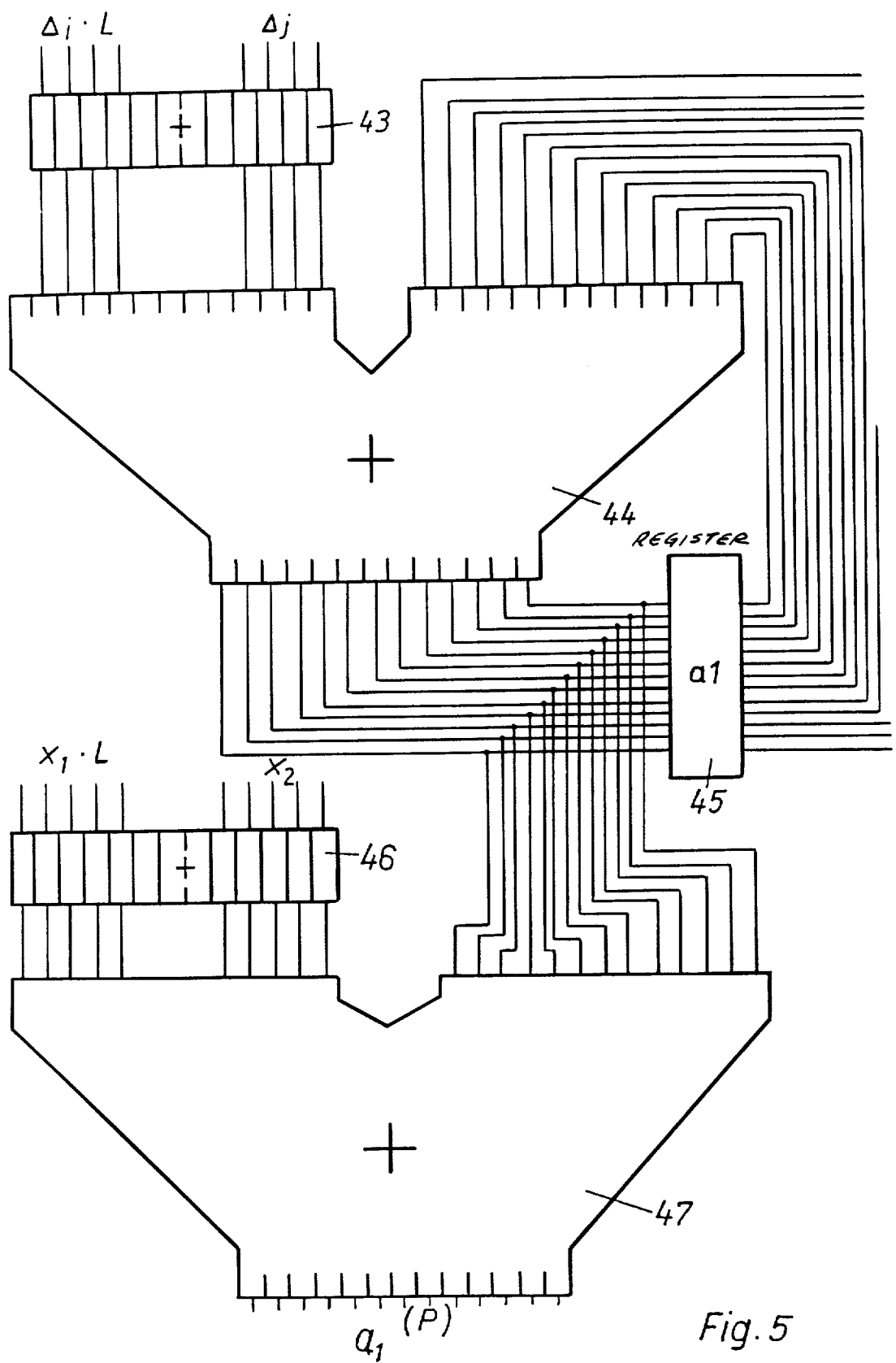
FIG. 5 is a schematic block circuit diagram of further groups of subcircuits for determining an address $a_1(P)$ for the i and j coordinates of a storage element, as applied in an actual embodiment of the circuit of FIG. 2.
Figure 6:
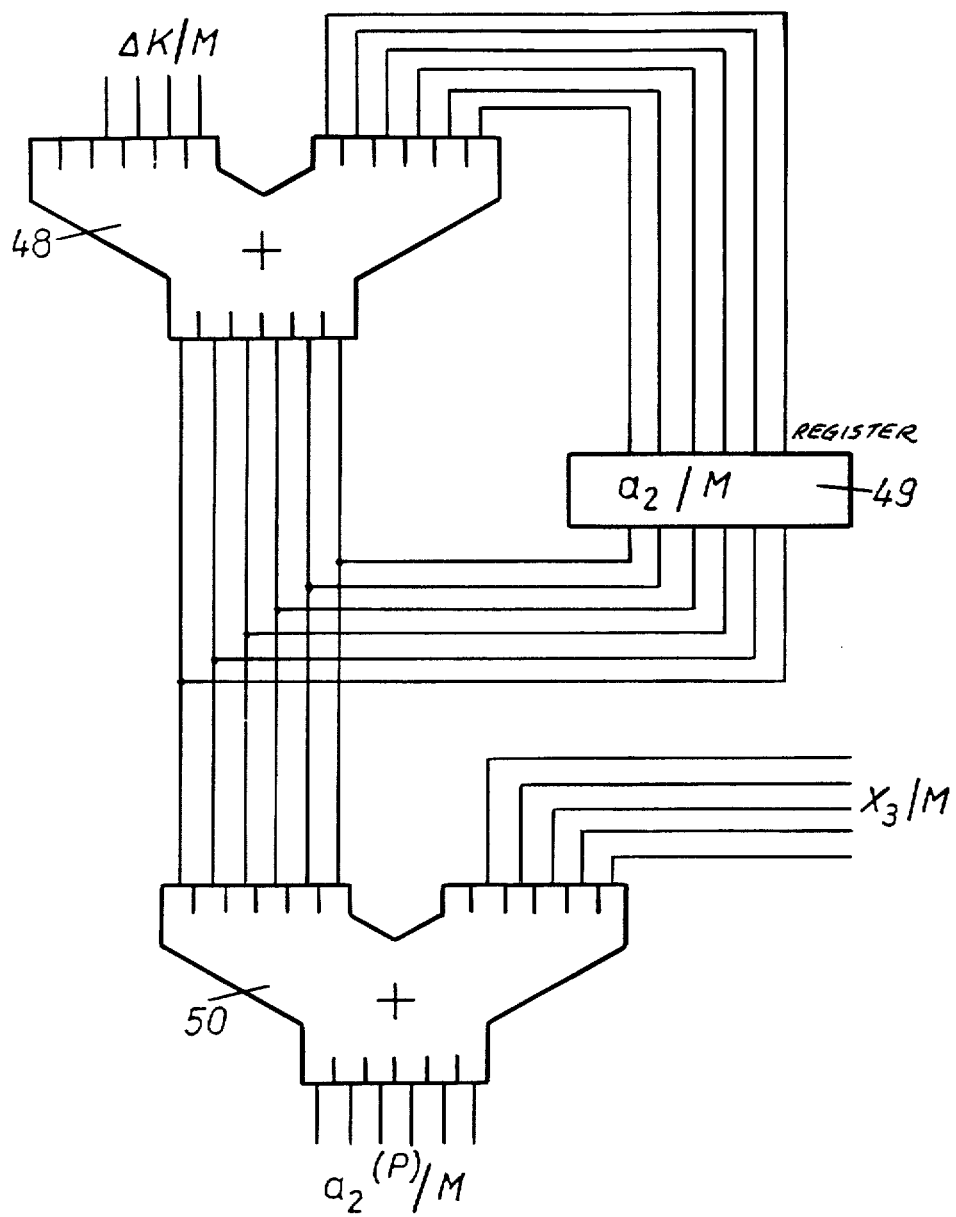
FIG. 6 is a block circuit diagram of a group of subcircuits for determining an address for the k-coordinate of a storage element pertaining to a computing circuit in the embodiment of FIG. 2.

FIGS. 4-6 illustrate the actual embodiment of the address-computing circuit of this invention. In this embodiment the multipliers 3 and 4 are represented by adding in adder 35 which also produces the intermediate sum of the summer 5 in FIG. 2. Adder 36 also produces an intermediate sum of input values and the two intermediate sums from the adders 35 and 36 are applied in corresponding digital order to the inputs of a third adder 37. The output value at the adder 37 has eight binary digits. The modulo-N-generator 6 in the embodiment of FIG. 4 is represented by the combinational ROM 38. Registers 40, 39 and the subtractor 41 function as the register 7 and subtractor 8 in FIG. 2. The functions of structural elements 31 through 34 in translator C are combined in an integrated circuit 42 which may be in the form of an ROM.

FIG. 5 illustrates the actual embodiment of a circuit arrangement for determining an address $a_1(P)$ for i and j coordinates of an arbitrary storage element P. Input values denoting coordinate variations Δi and Δj at the outputs of the constant multiplier 18 and the adder 19 are added in the adder 43, and in accordance with the operations performed in the adder 19 and multiplier 21 (modulo 1·L generator) are added in the adder 44 to the contents of the register 45 which stores the address portion determined by i and j for the storage element of the distinguished array points at the time point t+Δt. Vectors x₁ and x₂ according to the operations performed in the multiplier 23 and adder 22 are added in the adder 46. Adder 47 performs the remaining adding function of the adder 22 with the subsequent modulo-division of the multiplier 30. Due to the values L, the coordinate changes Δi·L and Δj as well as x₁·L and x₂ have no common binary word. The adders 43 and 46 illustrated in FIG. 5 represent the actual wiring with correct positions.

FIG. 6 depicts the remaining part of an address-computing circuit 1 which determines an address in the direction of the k-coordinate of a storage element. The adder 48 performs the functions of the constant multiplier 25 and of the adder 27. Shift register 49 stores the binary information pertaining to the address portion a₂ of the k-coordinate. The adder 50 performs the addition according to the adder 28 by a value x₃ and the multiplication by M. The adder 24 of FIG. 1 can be dispensed with, inasmuch as due to the selection of M the address portions $a_2^{(P)}$ and $a_1^{(P)}$ have no common range of binary words. Hence, $a_1^{(P)}$ is the low value part of an address and $a_2^{(P)}$ is the high value part of the address of the assigned storage element.

In windows of rectilinear form, the spacing values e₁, e₂, e₃ are applied instead of F. Values selected for the spacings e₁, e₂, e₃ are 0, 1 or 2.

The functions of elements 9-17 can be combined in an integrated circuit, for example in the form of a ROM 42 consisting of three stores for storing 64×5 bits each.

In FIG. 4 the inputs of the read-only memory 42 are designated both by values e₁, e₂ and e₃ as well as by the coded designation of the window F.

It will be understood that each of the elements described above, or two or more together, may also find a useful application in other types of constructions differing from the types described above.

While the invention has been illustrated and described as embodied in a multi-dimensional storing device for use with picture scanning, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A multi-dimensional parallel storage device assembled of a number N of storage elements, comprising a number N of address-computing circuits assigned to respective storage elements, each address-computing circuit including a circuit means A for recursive computation of a storage element for a distinguished array point for isotropic storage function after time point of shifting a memory window, said circuit means A having a plurality of inputs for receiving data pertaining to coordinate changes in a multi-dimensional storing array, and further including a plurality of outputs, a circuit means B for recursive address computation of a distinguished array point for isotropic addressing functions, said circuit means B having a plurality of inputs connected to the inputs of said circuit means A and further including a plurality of outputs; an interpreting circuit C for isotropic storing functions for determining a distance vector of an array point which is independent from the position of window and for which the address computation is made, said interpreting circuit including storage means for storing ascertained distance vectors from the distinguished array point, said interpreting circuit having an input connected to the output of said circuit means A an input for coded data of the considered window and further including a plurality of outputs for delivering values of said distance vectors $x_1, \ldots, x_n$ where n is the dimension of the array of points; and a circuit means D for determining an address of an arbitrary storage element pertaining to the address computation circuit, said circuit means having a plurality of inputs connected to the outputs of said interpreting circuit and to the outputs of said circuit means B, and an output for delivering the computed address.

2. A multi-dimensional parallel storage device as defined in claim 1, wherein said circuit means A for the recursive computation of a storage element of a distinguished array point comprises an adder having a plurality of inputs connected to respective inputs of the circuit means A, a register having its input connected to the output of the adder via a modulo-N-generator and having its output connected to an additional input of the adder, and further including constant multipliers connected in selected inputs to said adder to define the storage function.

3. A multi-dimensional parallel storage device as defined in claim 1, wherein the interpreting circuit includes a subtractor having its input connected to the output of the circuit means A, and having another input supplied with a number designating an arbitrary storing element, output of the subtractor being connected via a modulo-N-generator to addressing inputs of a plurality of stores constituting together an ROM memory, said stores of the ROM memory storing coordinate spacings of array points stored in individual storage elements whereby different spacing coordinates are assigned to different store addresses, the coordinate spacings being defined in response to a code for a memory window applied to another input of respective stores and in response to the selected storing function; and outputs of respective stores being connected to the outputs of said interpreting circuit.

4. A multi-dimensional parallel storage device as defined in claim 1 wherein the circuit means B for the recursive computation of the addresses of a distinguished array point for an isotropic addressing function according to the dimension n, $n \geq 2$, of the multidimensional parallel storage device comprises $n-1$ adders, one input of each adder being connected to an assigned input of said circuit means A and the first adder having another input connected to an assigned input of the circuit means A, and further including constant multipliers connected in selected inputs to said adders, $n-1$ registers, the first having its input connected via a modulo generator to output of the first adder and having its output connected to an additional input of the first adder and each of the other registers having its input connected to output of exactly one of the other adders and having its output connected to an additional input of the adder, the output of which is connected to the input of the considered register, and the inputs of the registers being connected to the outputs of the circuit means B.

5. A multidimensional parallel storage device as defined in claim 4 wherein said circuit means D for determining an address of an arbitrary storage element comprises a first adder having a first input connected to the output of the said circuit means B which is directly connected to the input of the first register of said circuit means B and a second input being connected to an assigned output of the said interpreter C and a third input being connected to another assigned output of the interpreter C and output being connected to a modulo generator and for every further output of the circuit means B a further adder having a first input connected to the output of the circuit means B and a second input connected to an assigned output of the interpreter C where selected outputs of the circuit means C and the inputs of corresponding adders in circuit means D are connected via constant multipliers and output connected to an input of an additional adder which comprises an additional input being connected to the output to the last mentioned modulo generator and output of the additional adder delivers the computed address.

6. A three-dimensional parallel storage device according to claims 1, 2, 3, 4, or 5, having a plurality of N (N>0) storage elements associated with the address-computing circuit, comprising a circuit means A having three inputs for receiving data corresponding to coordinate changes $\Delta i, \Delta j, \Delta k$, an adder having a plurality of inputs, two of said inputs being connected to the inputs $\Delta i$ and $\Delta k$ via multipliers for multiplying the coordinate change value by constants a and b;

the circuit means B including an adder having a plurality of inputs, one of said inputs being connected to the input $\Delta i$ via a multiplier multiplying with a constant L which is larger than or equal to number of array points in one line in j-direction, the other input of the adder being directly connected to the input $\Delta j$, and the input $\Delta k$ being connected via a multiplier by a constant M to an additional adder whose output is connected to one output of the circuit means B;

and the circuit means D including three adders and three multipliers, each having two inputs and an output, an input of the first adder being connected to the output of the first adder in the circuit means B and the other input of the first adder being connected to j-coordinate in the interpreting circuit C and an additional input of the first adder being connected via a multiplier by a constant L to output of i-coordinate of the interpreting circuit C, an input of the second adder being connected to the output of the second adder in the circuit means B and a second input connected via a multiplier by a constant M to the output for k-coordinate of the interpreting circuit C, an input of the third adder being connected to the output of the second adder and the second input of the third adder being connected via a modulo 1·L generator to the output of the first adder and the output of the third adder delivering the computer address, whereby M is larger than or equal to 1·L and 1 is a number so that smallest common denominator of 1 and $N_1$ is greater than or equal to the number of array points in one picture column (i-direction), whereby $N_1$ is the smallest number so that $N_1 \cdot a = 0 \mod N$.

7. A three-dimensional parallel storage device as defined in claim 5, wherein the interpreting circuit for a memory window having a rectilinear form in a three-dimensional array includes a subtractor having two inputs and an output; a first multiplier having two inputs and an output; six multipliers each having two inputs and an output; an adder having three inputs and an output and a reversing divider having an input and an output; said interpreting circuit having three inputs $e_1$, $e_2$, $e_3$ connected to the inputs of said adder via two multipliers by constants a and b and to the first inputs of additional three multipliers, the second inputs of the additional three multipliers being connected via a multiplier connected as a modulo-N-generator to the output of a fixed multiplier, inputs of said fixed multiplier being connected to the output of said subtractor and to the output of said divider and the input of said divider being connected to the output of said adder.

* * * * *